(No Model.)
A. NIESKE.
WARMTH RESERVOIR FOR EMITTING HEAT.
No. 247,393. Patented Sept. 20, 1881.
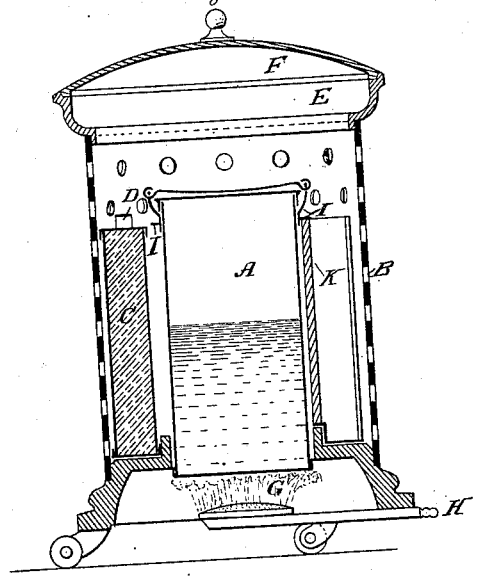
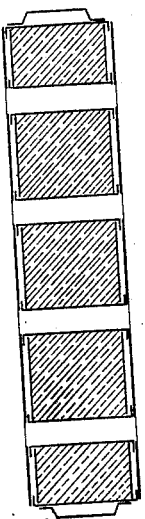
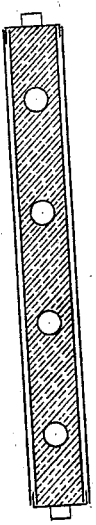
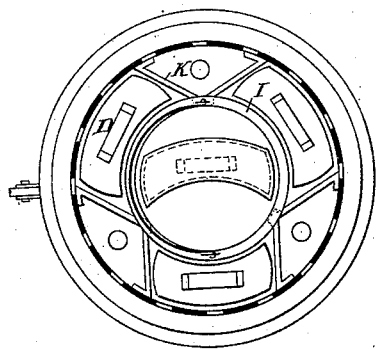
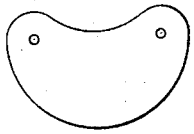
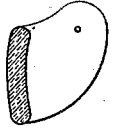
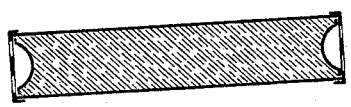
Witnesses
F. L. Middleton
David H. Mead
Inventor
Alwin Nieske
by Ellis Spear
Atty

UNITED STATES PATENT OFFICE.

ALWIN NIESKE, OF DRESDEN, SAXONY, GERMANY.

WARMTH-RESERVOIR FOR EMITTING HEAT.

SPECIFICATION forming part of Letters Patent No. 247,393, dated September 20, 1881.

Application filed May 25, 1881. (No model.)

*To all whom it may concern:*

Be it known that I, ALWIN NIESKE, chemist, a subject of the Kingdom of Saxony, in the German Empire, residing at the city of Dresden, in the Kingdom of Saxony and German Empire aforesaid, have invented certain new and useful Improvements in Warmth-Reservoirs for Emitting Heat for a Long Period; and I do hereby declare that the following is a full, clear, and exact description of the invention, which will enable others skilled in the art to which it appertains to make and use the same.

This invention relates to the manufacture and construction of warmth-reservoirs, which said reservoirs, vessels, or receptacles are filled with sodaic salts in certain given proportions, which said sodaic salts possess the property of retaining warmth for a long time, and slowly communicating the latent warmth of the said salts to their surroundings, and which said invention is therefore suited for application to various purposes.

Many experiments in laboratories have proved that some of the sodaic salts, after being heated, retain their latent warmth—that is, they only emit or give off their warmth as they slowly crystallize. There are in especial two salts which are admirably suited to this purpose: first, hyposulphite of soda, and, second, acetate of soda. The first-named salt (hyposulphite of soda) has the property of melting easier than the latter, (acetate of soda.) Consequently, when this said hyposulphite of soda is mixed with acetate of soda, the former prevents the latter from crystallizing too rapidly. The two salts combine and form a permanent filling, so that the reservoirs, vessels, or receptacles containing the same can be soldered down, and thus hermetically closed.

I have found it preferable to employ the following proportion of the aforenamed salts—that is, one part hyposulphite of soda to ten parts acetate of soda.

The warmth reservoirs or receptacles are filled to about three parts full and the lid soldered on. In order to prepare the said warmth-reservoirs for employment, the same are placed in boiling water until the filling is melted. This is readily ascertained by shaking the reservoir or vessel. The said reservoir, vessel, or receptacle can be modified in form, according to the requirements of the situation, without departing from the tenor of my invention.

Figure 1 is a vertical section, and Fig. 2 is a horizontal section, of a stove which is admirably suited for employment in bedrooms, hospitals, sick-rooms, offices, dwelling and other rooms. The said stove is placed on three feet, with casters, so as to enable the said stove to be easily transported from one place to another.

A is a vessel of cylindrical or other suitable form. B is a perforated mantle, forming the outer walls of the stove. The vessels, receptacles, or warmth-reservoirs C, filled with the sodaic salts above named, are arranged between the vessel A and the perforated mantle B of the stove. The warmth-reservoirs are of such size that they can be inserted in the central vessel, A, by means of their handles D. The stove is closed by the cap E and lid F, which can be readily removed. The water in the vessel A can be brought to a boiling-point by means of the burner G, to the end H of which said burner a tube of elastic or other suitable material is attached, which said tube is in connection with a suitable gas-pipe.

As soon as the water in the vessel A has been brought up to the boiling-point, the vessels, receptacles, or reservoirs C, which contain the aforenamed sodaic salts, are inserted in the said vessel A until the salts contained in the reservoir C are melted. The reservoirs are now replaced in their former position, between cylinder and mantle, and emit the warmth contained in the same so gradually and equably that the filling, even after a lapse of from ten to twelve hours, is found to be warm.

The cylinder or vessel A can be entirely removed from the stove, and the warmth-reservoirs heated, or the sodaic salts contained in the same melted in any suitable boiler or similar receptacle, or the vessel C can be heated in any other suitable room. The cylindrical vessel A is for this purpose provided with a projecting ring or flange, I, which lies on three supports or brackets, K, the brackets also serving to prevent any great movement of the reservoirs C.

The evaporation of the water in the vessel A possesses the great advantage that it moistens the air in the room.

Figs. 3, 4, and 5 show my invention as applied to foot-warmers for railway-carriages. For such foot-warmers I employ tubing or pipes running through the filling, so as to attain a greater surface for the emission of warmth. Such foot-warmers retain their warming properties for about twelve hours.

Figs. 6 and 7 show a stomach and back warmer, which is carried next the body, under the clothing, for medicinal purposes. Stomach, chest, and other warmers can be employed with the same filling, and are admirably adapted for employment in hospitals, sick-rooms, and such like. The warmth emitted by these warmth-reservoirs is especially beneficial to patients, as the heat remains equable, continues for several hours, and is not only agreeable, but also beneficial.

Figs. 8 and 9 represent a universal warmth-reservoir, by which the handle is countersunk. The same can be covered with carpet and be employed as foot-warmer for carriages, sleighs, as footstool for dwelling-rooms, churches, offices, &c. If the carpet is taken off, the same reservoir can be employed as a bed-warmer. The sheet-metal casing can be used for heating the warming-bottle.

Another application to which this class of warmth-reservoir can be put is to place the same within a nickeled ball, which can be easily carried in a muff, fur, overcoat, &c., and can be held in the hand while skating, riding, driving, walking, and so on in cold weather. These said balls, filled with sodaic salts, are placed in hot water for a suitable period, and as they retain their heat for a very long time and emit great warmth they prove a most agreeable acquisition for travelers, &c., in winter.

These warmth-reservoirs can also be most advantageously employed for artificial breeding apparatus or incubators, as the warmth remains continuously the same, and is therefore the very best substitute for the natural warmth of the blood.

These warmth-reservoirs can also be applied to the most various household purposes, and in hotels for warming plates, &c., or for keeping food warm when meals are taken out of doors.

I am, however, aware that it has been proposed to use various substances as a filling for boxes designed to supply heat for railway-carriages, among which acetate of soda has been mentioned, and I do not therefore claim, broadly, the use of this or any particular sodaic salt.

I do not broadly claim the chemical compound of hyposulphite of soda and acetate of soda in the proportions indicated; but What I do claim and desire to have protected by Letters Patent, is—

1. In a heating apparatus, the combination of a suitable inclosing-case having openings to permit the escape of heat and one or more closed receptacles, each containing a filling of hyposulphite of soda and acetate of soda, combined in about the proportions specified.

2. In a heating apparatus, the water-reservoir A and burner G, in combination with the warmth-reservoir C, containing an easily-fusible substance, substantially as described.

ALWIN NIESKE.

Witnesses:
OTTO WOLFF,
RICH. LANGER.